United States Patent Office 3,787,387
Patented Jan. 22, 1974

3,787,387
2:1 METAL COMPLEXES OF 2,2',4'-TRIHYDROXY-3,5-DINITROAZOBENZENE BOUND TO A DIPHENYLAMINE THROUGH AN AZO BRIDGE
Heinz Wicki, Allschwil, Basel-Land, Switzerland, assignor to Sandoz Ltd., Basel, Switzerland
No Drawing. Filed Aug. 3, 1970, Ser. No. 60,748
Claims priority, application Switzerland, Aug. 7, 1969, 11,976/69
Int. Cl. C09b 45/26, 45/32; D06p 3/32
U.S. Cl. 260—145 A                 12 Claims

ABSTRACT OF THE DISCLOSURE

New metallized polyazo dyes which are notable for their improved power of exhaustion on leathers of low affinity and are used for dyeing and printing various types of leather. It is desirable for these dyes to contain as basic structural unit a group of the formula

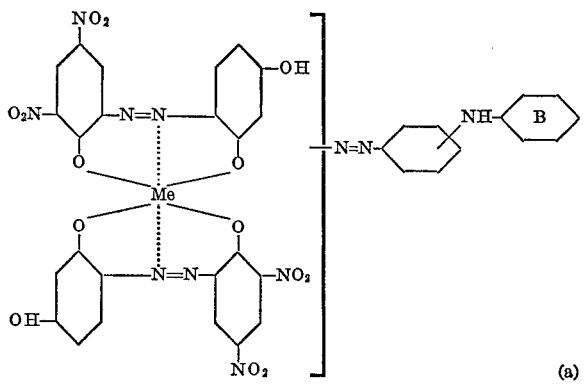

(a)

in which the aromatic ring B bears preferably an

—SO₃H— and an —NO₂— group. The molecule may contain up to three additional arylazo groups but preferably not more than one.

---

This invention is directed to new metallized polyazo dyes which are notable for their improved power of exhaustion on leathers of low affinity and are used for dyeing and printing various types of leather. It is desirable for these dyes to contain as their basic structural unit a group of the formula

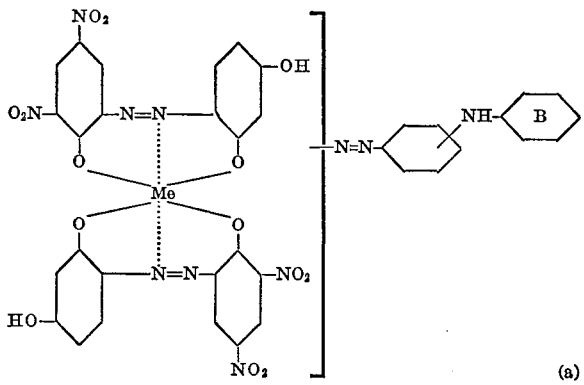

(a)

in which the aromatic ring B bears preferably an

—SO₃H and an —NO₂ group.

The invention thus relates to new metallized polyazo dyes, and mixtures of the said dyes, which are of the formula

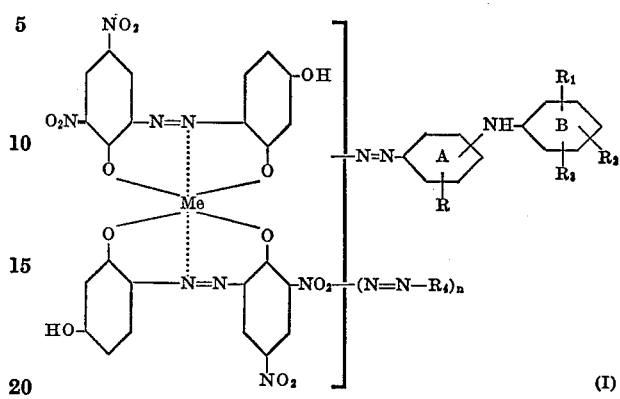

(I)

where

R stands for hydrogen, halogen, nitro, substituted or unsubstituted alkyl or alkoxy, —COOH or —SO₃H,
R₁ for hydrogen, halogen, nitro, substituted or unsubstituted alkyl or alkoxy, —COOH or —SO₃H,
R₂ for hydrogen, halogen, nitro, substituted or unsubstituted alkyl or alkoxy, —COOH or —SO₃H,
R₃ for hydrogen, halogen, nitro, substituted or unsubstituted alkyl or alkoxy, —COOH or —SO₃H,
R₄ for the radical

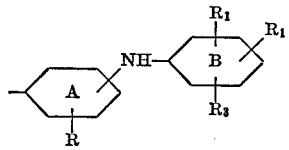

or the radical of a freely selected diazo component,
Me for a metal atom, and
n for 0 to 3.

The new dyes can be produced by coupling in either order 1 mole of the diazo compound from an amine of the formula

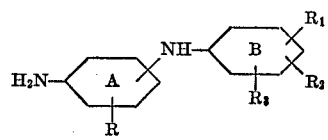

(II)

and 0 to 3 moles of the diazo compound from an amine of the formula

R₄—NH₂                 (III)

with 2 moles of a compound of the formula

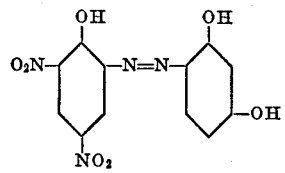

(IV)

and treating the resulting azo compound in substance with a metal donor to give the compound of Formula I.

Good dyes of the Formula I are obtained by coupling 1 mole of a compound of the formula

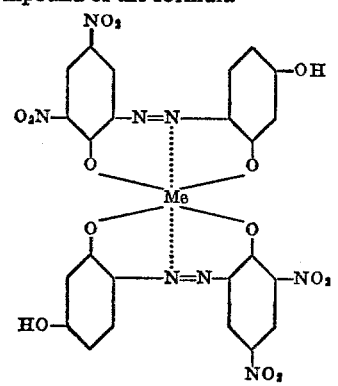

(V)

with 1 mole of the diazo component from an amine of Formula II and 0 to 3 moles of the diazo compound from an amine of Formula III. It is preferable for $n$ to represent zero or the figure 1. Iron, chromium and cobalt compounds are of special interest for the production of these metallized dyes. Good dyes are obtained when a coupling component of Formula V containing iron, chromium or cobalt is used.

Equally good azo dyes are of the formulae

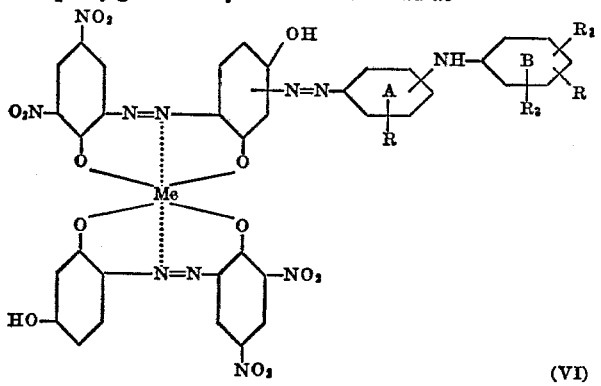

(VI)

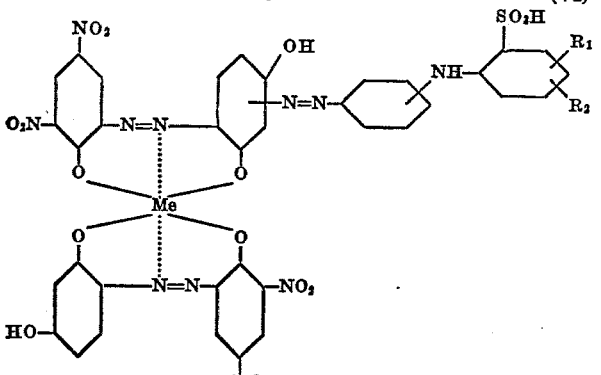

(VII)

and in particular of the formula

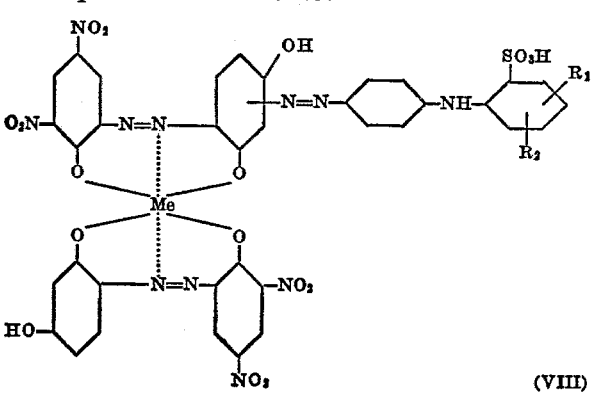

(VIII)

and of the formula

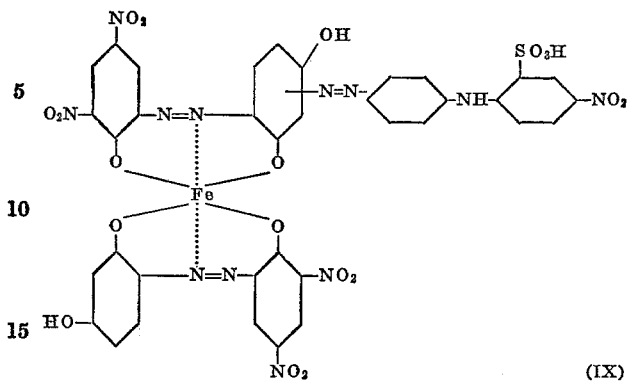

(IX)

where Fe represents an iron atom.

Comparably good azo dyes are those of the following formulae:

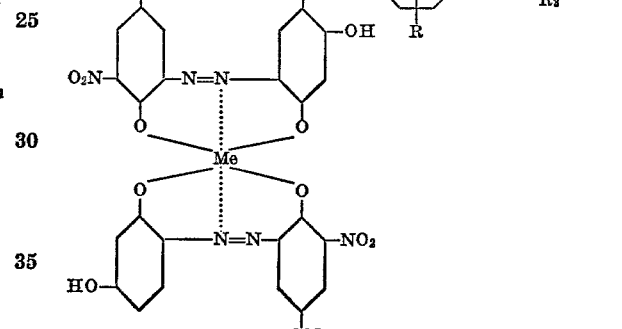

(X)

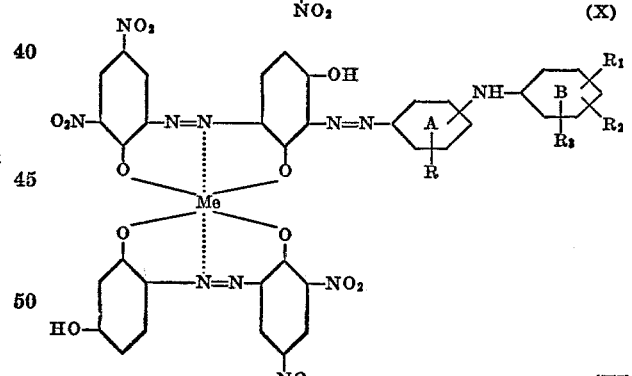

(XI)

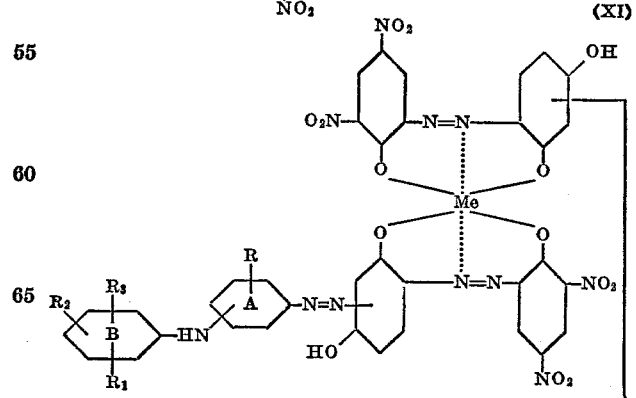
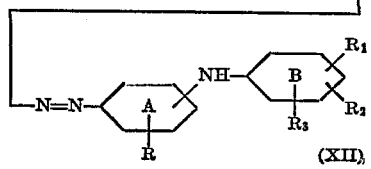

(XII)

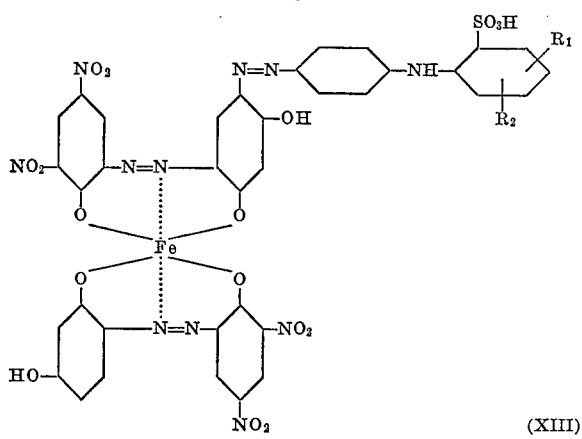

(XIII)

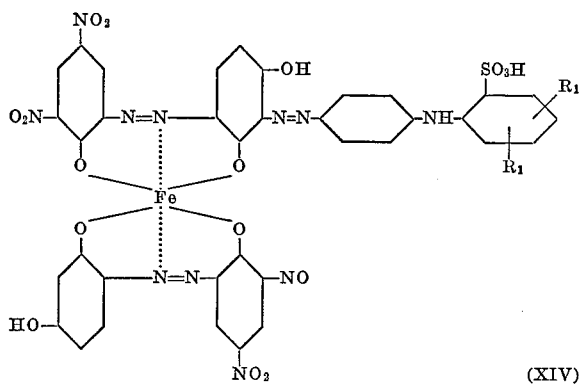

(XIV)

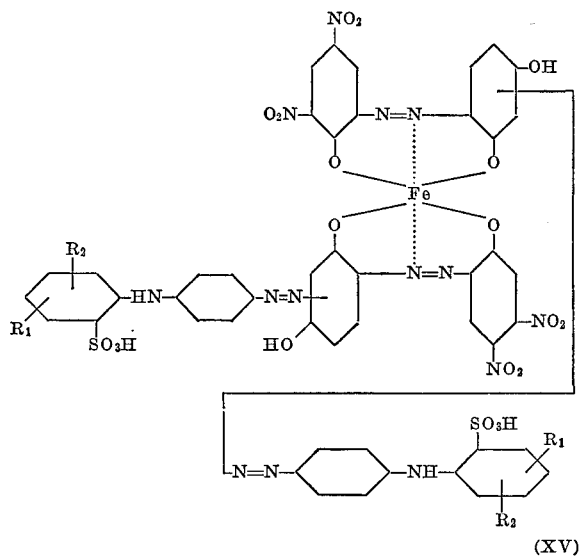

(XV)

Any of the known coupling methods can be used. For instance, the coupling reaction yielding the monoazo dye of Formula IV can be carried out in aqueous alkaline medium at a temperature from −10° C. to room temperature, if necessary in the presence of sodium chloride.

Similarly, the coupling of the monoazo dye of Formula IV with a diazotized aminodiphenylamine or another diazo component to form the final dye can be carried out in aqueous alkaline medium at temperatures of −10° C. to room temperature.

Metallization is best carried out in aqueous medium, with the addition of an organic solvent if necessary, or in an organic solvent alone. For this step of the process an acid medium is best, although metallization can also be accomplished in neutral to alkaline medium.

The suitable chromium compounds include chromium trioxide, chromic fluoride, chromic sulphate, chromic formate, chromic acetate, chromic potassium sulphate and chromic ammonium sulphate. The chromates, e.g. sodium and potassium chromate and bichromate, are also highly suitable for metallization. Iron and cobalt formate, acetate, sulphate and chloride exemplify the suitable iron and cobalt compounds.

In each instance "halogen" represents bromine or fluorine, or preferably chlorine. The substituted or unsubstituted alkyl and alkoxy radicals are preferably lower molecular and have 1, 2, 3 or 4 carbon atoms. If they are substituted they bear, in particular, halogen atoms hydroxy or cyano groups; these radicals then stand for methyl, ethyl, propyl, iso-propyl, butyl, iso-butyl, methoxy, ethoxy, cyanoethyl, hydroxyethyl, chloromethyl, chloroethyl, etc. Examples of suitable diazo components are those of substituted or unsubstituted aminobenzenes, aminonaphthalenes, aminohydroxynaphthalenes, aminonaphthalenesulphonic acids, aminohydroxynaphthalenesulphonic acids, etc. These latter radicals, and also the rings A and/or B, may be substituted by halogen, nitro, cyano, hydroxyl, amino, alkyl, alkoxy, sulphonic acid (sulfo), carboxyl, sulphonic acid or carboxylic acid amide (sulfamoyl or carbamoyl), alkylsulphonyl, arylsulphonyl, etc. Alternatively, they may be substituted by azo compounds.

The compounds of Formula I may bear 1 to 6, or optimally 1 to 4, identical or different sulphonic acid or carboxylic acid groups.

The metallized polyazo dyes of this invention are used for dyeing and printing leather. They are notable for good power of build-up from neutral to weakly acid dyebaths and good level dyeing properties. On leathers tanned with different tanning agents they give dyeings of consistent shade which have good fastness to light, water, washing, perspiration, ironing and formaldehyde. The dyeings on chrome suede leather show good buffing fastness. On leathers with low affinity for dyes, such as those with a chrome-vegetable or chrome-synthetic tannage, the dyes build up to give dyeings of full depth; they also show good exhaustion power from a neutral medium on this type of leather.

In relation to the nearest comparable dyes of French Pat. 1,431,548 the dyes of Formula I are of higher solubility, notably in water, and show superior levelling properties on grain leather.

In the following examples the parts are by weight and the temperatures in degrees centigrade.

EXAMPLE 1

199 parts of 2-amino-4,6-dinitrophenol are diazotized and coupled at pH 9 with 110 parts of 1,3-dihydroxybenzene using the normal methods. The resulting compound of Formula IV is isolated, stirred into water and coupled at pH 9 by the normal method with the diazo compound prepared from 309 parts (1 mole) of 4-amino-4′-nito-2-sulphodiphenylamine.

To 1 mole of the disazo dye formed, which has the formula

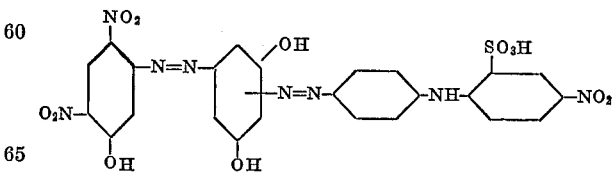

is added 1 mole of the monoazo compound of Formula IV. The mixture is metallized in aqueous solution with 300 parts of iron sulphate at pH 4 and 95–100°. The iron-containing dye is isolated with sodium chloride and dried. It is a brown powder which dissolves in water with a dark brown color. It gives fast, deep dyeings of red-brown shade on leather, especially on material showing low affinity for dyes, such as chrome leather retanned with vegetable and synthetic tanning agents.

EXAMPLE 2

Two moles of the compound of Formula IV, formed as in Example 1, and a solution of 1 mole of iron sulphate in 500 parts of water and mixed in water at pH 4. The mixture is reacted for 1 hour at 98–100°. The metallized dye is isolated and suspended in 500 parts of water. At pH 9 the diazo compound, prepared with 309 parts of 4-amino-4'-nitro-2'-sulphodiphenylamine, is dropped into the suspension. On completion of the coupling reaction the dye is isolated with sodium chloride and dried. It is obtained as a dark brown powder which dissolves readily in water and gives fast red-brown dyeings on leather.

EXAMPLE 3

One mole of the compound of Formula IV produced as given in Example 1, is stirred into 500 parts of water and coupled at pH 9 with the diazo compound prepared from 132 parts (half a mole) of 4-amino-2-sulphodiphenylamine. After coupling, the diazo compound from 86 parts of 1-amino-4-sulphobenzene is added at pH 9 and the mixture is stirred for 1 hour. When this coupling reaction is complete, the solution is adjusted to pH 4 and 150 parts of iron sulphate are added. Metallization is then carried out for 1 hour at 100°. Afterwards the metallized dye is isolated with sodium chloride and dried. It is a dark brown powder, well soluble in water, which produces fast, dark red-brown dyeings on leather.

EXAMPLE 4

One mole of the compound of Formula IV, produced as in Example 1, is stirred into 500 parts of water and coupled at pH 9 with the diazo compound obtained with 264 parts of 4-amino-2-sulphodiphenylamine.

A further mole of the compound of Formula IV, formed as in Example 1, is stirred into 500 parts of water and coupled at pH 9 with the diazo compound from 172 parts of 1-amino-3-sulphobenzene.

The two disazo dye solutions are combined, the pH value is adjusted to 4 and 300 parts of iron-(III)-chloride added. The solution is then raised to 90–100° and held for 1 hour at this temperature for metallization. Subsequently, sodium chloride is added to isolate the metallized dye formed. On drying, a dark red-brown, water soluble powder which dyes leather in dark red-brown shades is obtained.

The table below shows the structural composition of further dyes which can be produced in accordance with the procedures of Examples 1 to 4. They are of Formula I and are specified by the compound of Formula V in column A, the amine of Formula II in column B, the amine of Formula III in column C and in the final column by the shade of the dyeing on leather given by the iron, cobalt and chromium complexes of the dye.

TABLE

| Ex. No. | A Component of formula (V) | B Amine of formula (II) | C Amine of formula (III) | D Fe | D Co | D Cr |
|---|---|---|---|---|---|---|
| 5 | Compound of formula (V). | $NH_2$–⟨$CH_3$⟩–NH–⟨$SO_3H$⟩–$NO_2$ | $NH_2$–⟨$CH_3$⟩–$SO_3H$ | Dark red-brown. | Dark violet brown. | Dark violet brown. |
| 6 | do | $NH_2$–⟨⟩–NH–⟨$COOH$, $NO_2$⟩–$NO_2$ | do | do | do | Do. |
| 7 | do | $NH_2$–⟨⟩–NH–⟨$SO_3H$⟩–$NO_2$ | $NH_2$–⟨$SO_3H$⟩–NH–⟨⟩ | do | do | Do. |
| 8 | do | Same as above | $NH_2$–⟨$SO_3H$⟩–$NO_2$ | do | do | Do. |
| 9 | do | do | $NH_2$–⟨⟩–⟨$SO_3H$⟩ (naphthyl) | do | do | Do. |
| 10 | do | do | $NH_2$, OH naphthalene with $SO_3H$, $SO_3H$ | do | do | Do. |
| 11 | do | do | $NH_2$–⟨HO⟩–$SO_3H$–⟨$NO_2$⟩ | do | do | Do. |
| 12 | do | $NH_2$–⟨$CH_3$, $NO_2$⟩–NH–⟨⟩–$SO_3H$ | do | do | do | Do. |

TABLE—Continued

| Ex. No. | A<br>Component of formula (V) | B<br>Amine of formula (II) | C<br>Amine of formula (III) | D Fe | D Co | D Cr |
|---|---|---|---|---|---|---|
| 13 | Compound of formual (V) | NH₂–⟨⟩–NH–⟨⟩(SO₃H)–NO₂ | | Dark red-brown. | Dark violet brown. | Dark violet brown. |
| 14 | ...do... | NH₂–⟨⟩–NH–⟨⟩(NO₂)–SO₃H | | do | do | Do. |
| 15 | ...do... | NH₂–⟨⟩(SO₃H)–NH–⟨⟩(SO₃H)–NO₂ | | do | do | Do. |
| 16 | ...do... | NH₂–⟨⟩–NH–⟨⟩(COOH)–NO₂ | NH₂–⟨⟩(SO₃H)–NO₂ | do | do | Do. |
| 17 | ...do... | NH₂–⟨⟩–NH–⟨⟩(COOH)(NO₂)–NO₂ | NH₂–⟨⟩(SO₃H) | do | do | Do. |
| 18 | ...do... | NH₂–⟨⟩–NH–⟨⟩(SO₃H)–NO₂ | NH₂–⟨⟩(Cl)–NO₂ | do | do | Do. |

Dyeing Example A

In a drum dyeing machine 100 parts of freshly tanned, neutralized chrome grain leather are dyed for 30 minutes at 65° from a liquor consisting of 250 parts of water and 1 part of the dye synthesized as given in Example 1. After this time 2 parts of an anionic fat liquor based on sulphonated train oil are added and drumming is continued for 30 minutes. The leather is then removed, dried under standard conditions and finished. The red-brown dyeing obtained on the leather is extremely level.

Dyeing Example B 100 parts of calf suede are wet back in a drum dyeing machine for 4 hours in a bath of 1000 parts of water and 2 parts of ammonia. The bath is dropped and a fresh bath set with 500 parts of water, 2 parts of ammonia and 10 parts of the dye described in Example 1. The suede is drum dyed in this bath for 1 hour 30 minutes at 65°. To exhaust the dyebath, 4 parts of 85% formic acid are slowly added, after which the leather is drummed further to complete fixation of the dyeing. On removal the suede is rinsed, dried and finished by the normal methods, and the nap buffed. The suede is dyed in a red-brown shade of notably good levelness.

Dyeing Example C 100 parts of chrome-vegetable tanned lambskin are dyed in a drum dyeing machine for 45 minutes at 55° from a bath of 1000 parts of water, 1.5 parts of an anionic sperm oil emulsion and 10 parts of the dye produced as in Example 1. The dyeing is fixed by the gradual addition in 30 minutes of 5 parts of 85% formic acid. After the normal drying and finishing treatments a leather is obtained dyed in a level red-brown shade.

Dyeing Example D

A solution of 20 parts of the dye of Example 1 in 847 parts of water, 150 parts of ethyl glycol and 3 parts of 85% formic acid is applied to the grain side of a buffed, combination tanned side leather, either by spraying, flow coating or with a plush pad. The leather is dried under mild conditions and finished. A level, red-brown leather dyeing is obtained which has good fastness properties.

Formulae of representative dyes of the foregoing examples are as follows:

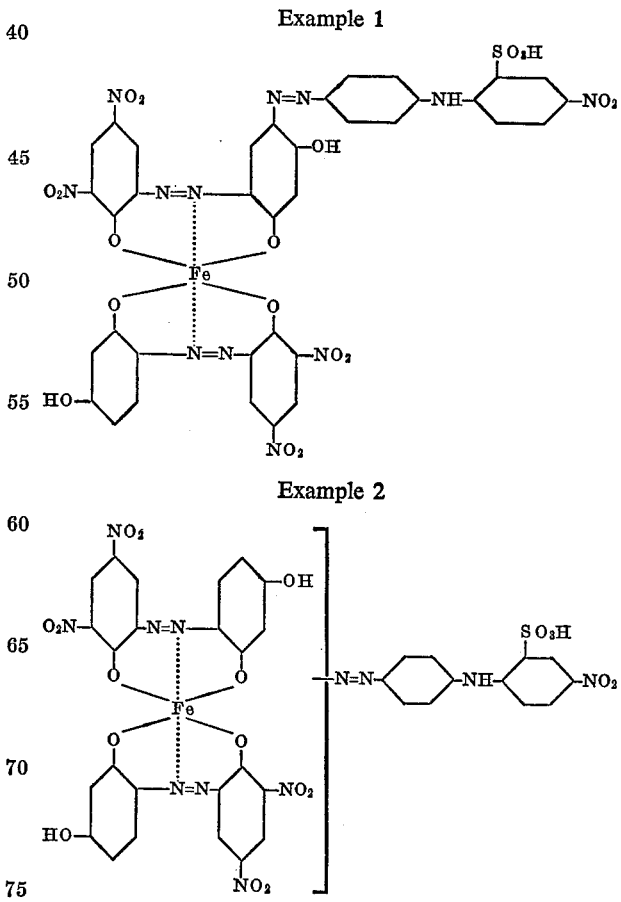

Example 1

Example 2

Example 9

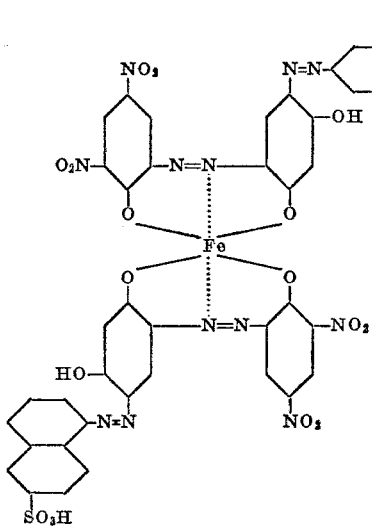

Example 11

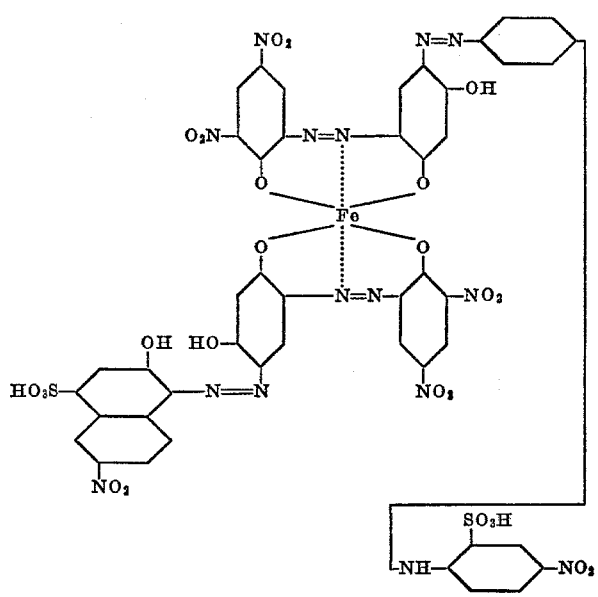

Example 14

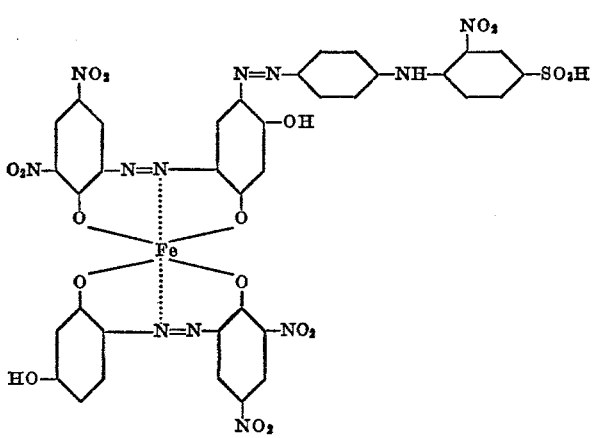

Having thus disclosed, the invention what I claim is:
1. A dye of the formula

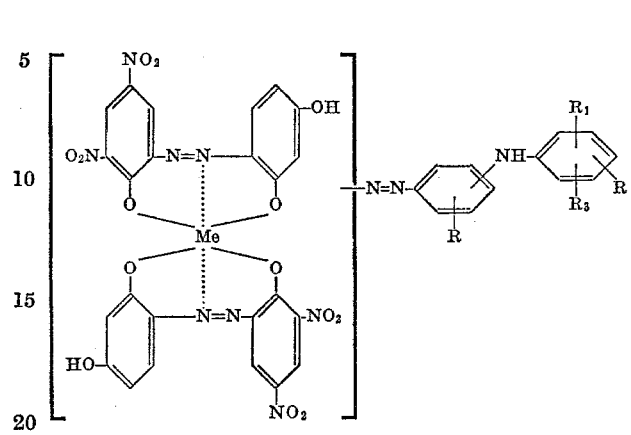

wherein
each of R, $R_1$, $R_2$ and $R_3$ is independently hydrogen, halo, nitro, alkyl, monosubstituted alkyl, alkoxy, monosubstituted alkoxy, carboxy or sulfo, wherein the substituent of each monosubstituted alkyl and monosubstituted alkoxy is independently halo, hydroxy or cyano, and
Me is iron, cobalt or chromium,
wherein each halo is independently chloro, bromo or fluoro, and
each alkyl, alkoxy, alkyl chain of monosubstituted alkyl and alkoxy chain of monosubstituted alkoxy independently has 1, 2, 3 or 4 carbon atoms.

2. A dye according to claim 1 having the formula

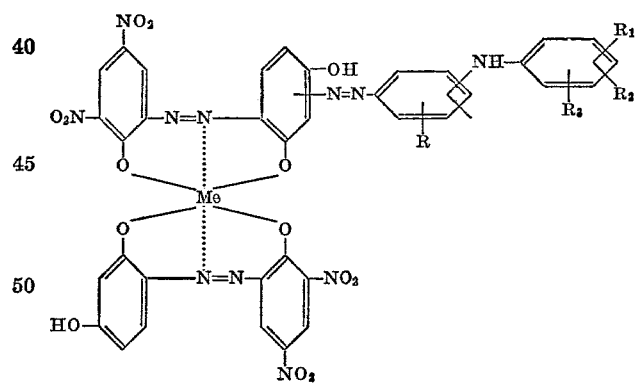

3. A dye according to claim 2 having the formula

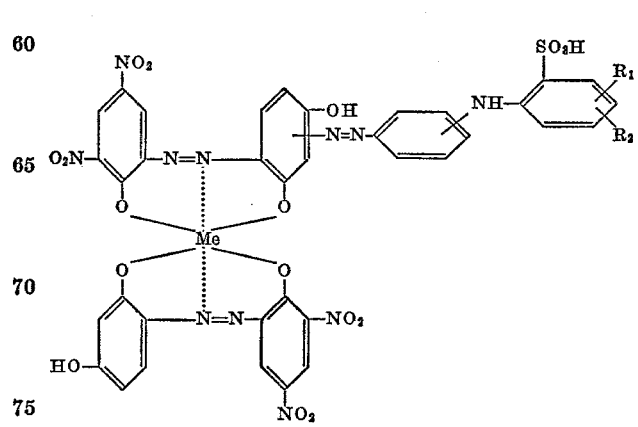

4. A dye according to claim 3 having the formula
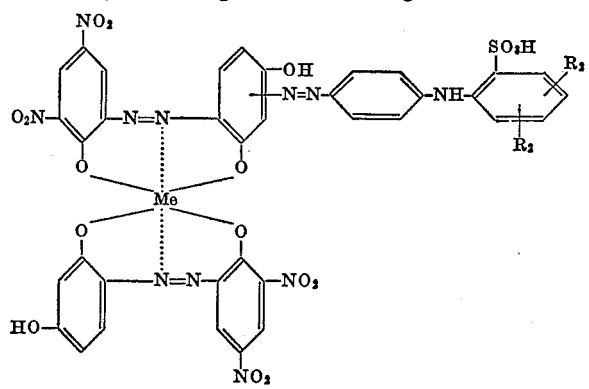
5. A dye according to claim 4 having the formula
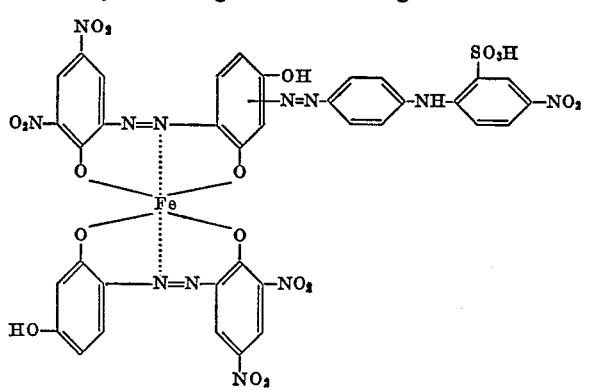
6. A dye according to claim 2 having the formula
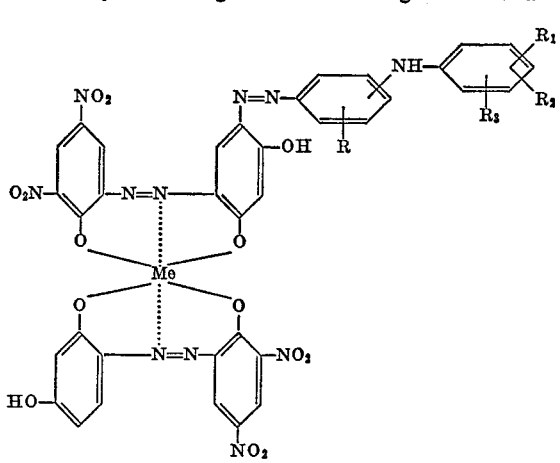
7. A dye according to claim 6 having the formula
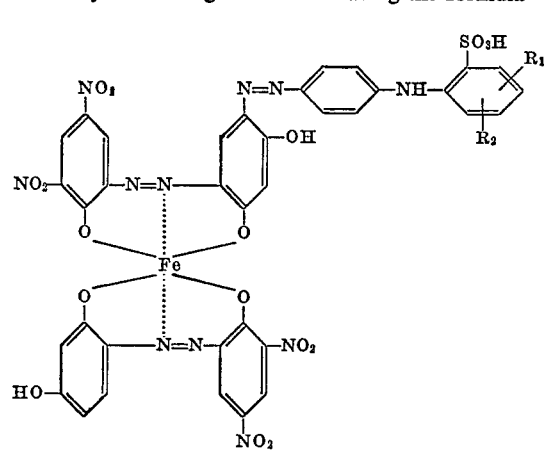
8. A dye according to claim 2 having the formula
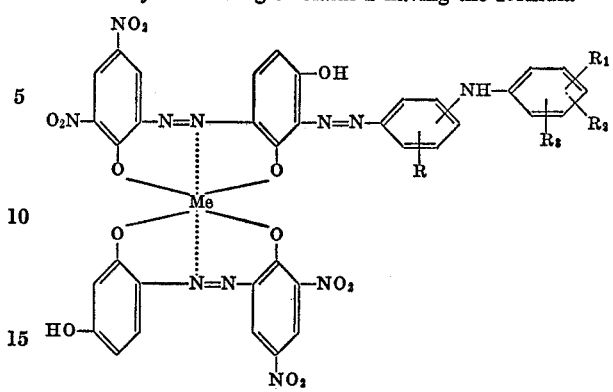
9. A dye according to claim 8 having the formula
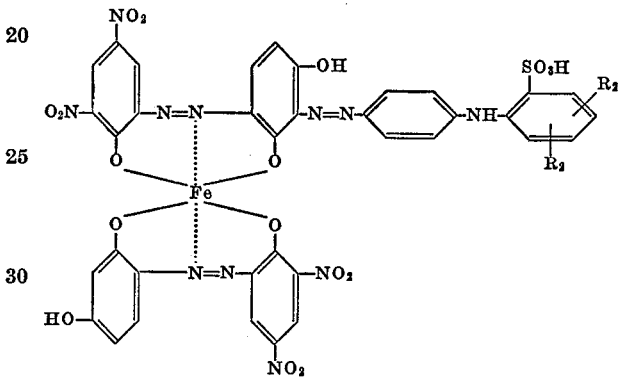
10. The dye according to claim 1 having the formula
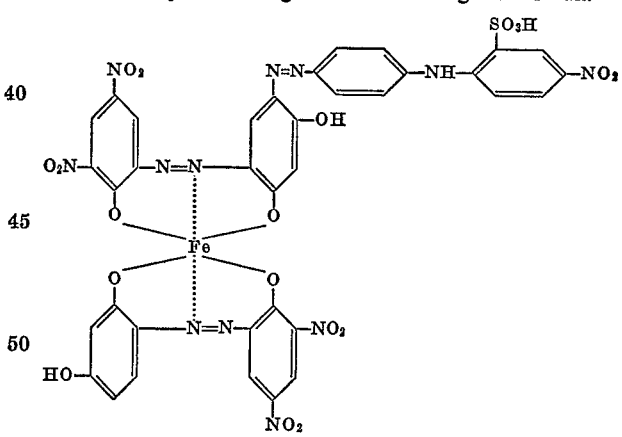
11. The dye according to claim 1 having the formula
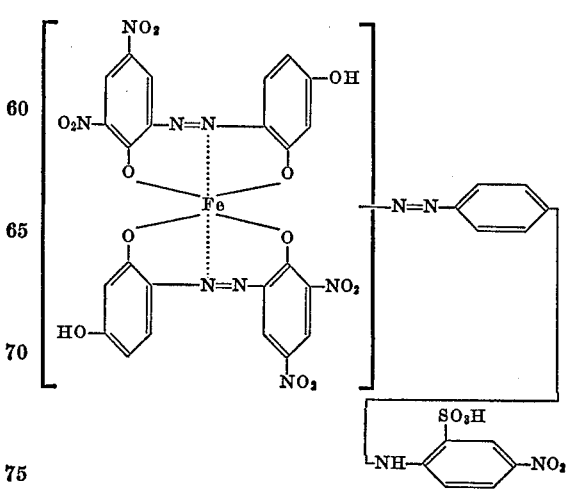

12. The dye according to claim 1 having the formula
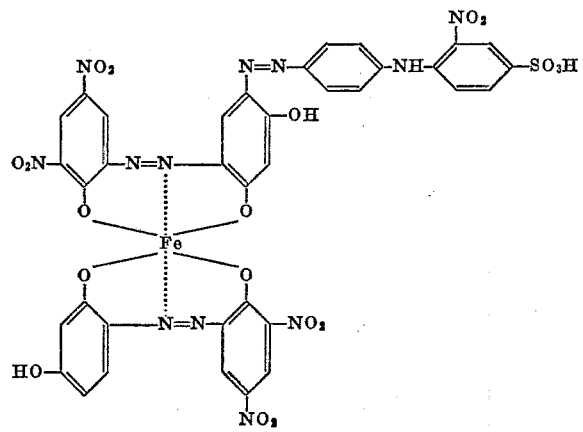
References Cited
UNITED STATES PATENTS
| | | | |
|---|---|---|---|
| 2,775,581 | 12/1956 | Neier et al. | 260—145 B |
| 2,933,488 | 4/1960 | Biedermann et al. | 260—145 A |
| 2,933,489 | 4/1960 | Biedermann et al. | 260—145 A |
| 2,933,490 | 4/1960 | Biedermann et al. | 260—145 A |
| 3,354,253 | 12/1967 | Biedermann et al. | 260—145 R |
| 3,374,219 | 3/1968 | Biedermann et al. | 260—145 R |
| 3,398,132 | 8/1968 | Dehnert | 260—145 R |
| 3,406,160 | 10/1968 | Wicki | 260—145 R |
| 3,459,727 | 8/1969 | Steiner et al. | 260—145 R |
FLOYD DALE HIGEL, Primary Examiner
U.S. Cl. X.R.
8—13; 260—177, 184, 186

UNITED STATES PATENT OFFICE
CERTIFICATE OF CORRECTION

Patent No. 3,787,387                     Dated January 22, 1974

Inventor(s)  HEINZ WICKI

It is certified that error appears in the above-identified patent and that said Letters Patent are hereby corrected as shown below:

Column 2, lines 32-39, that portion of the formula reading

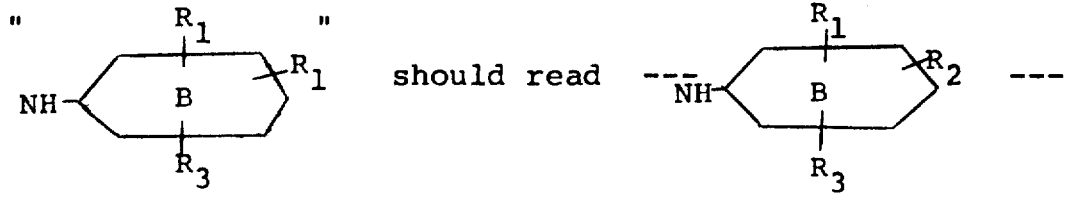

Column 5, lines 20-34, that portion of formula (XIV) reading

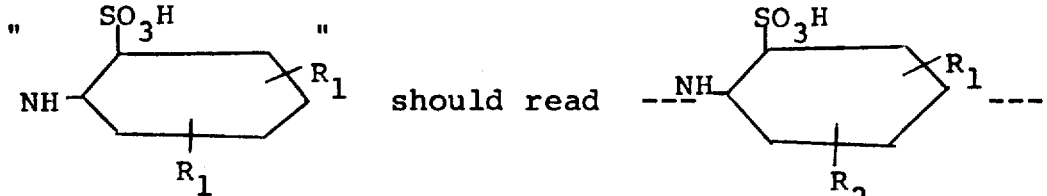

Column 6, line 56, "-nito-" should read --- nitro ---.

Claim 1, that portion of the formula reading

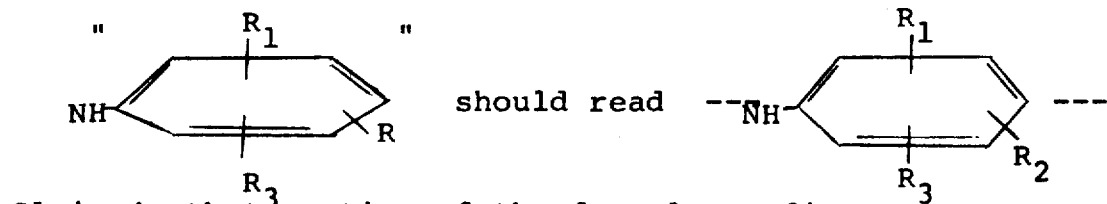

Claim 4, that portion of the formula reading

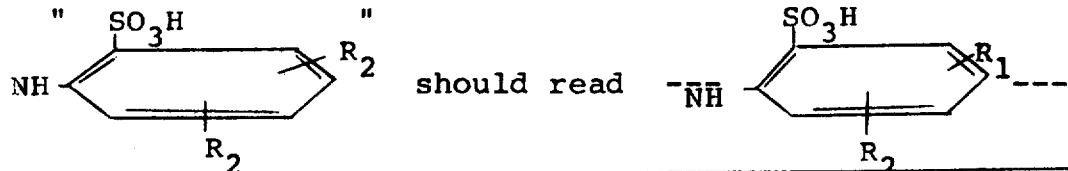

UNITED STATES PATENT OFFICE
CERTIFICATE OF CORRECTION

Patent No. 3,787,387    Dated January 22, 1974

Inventor(s) HEINZ WICKI

It is certified that error appears in the above-identified patent and that said Letters Patent are hereby corrected as shown below:

Claim 9, that portion of the formula reading

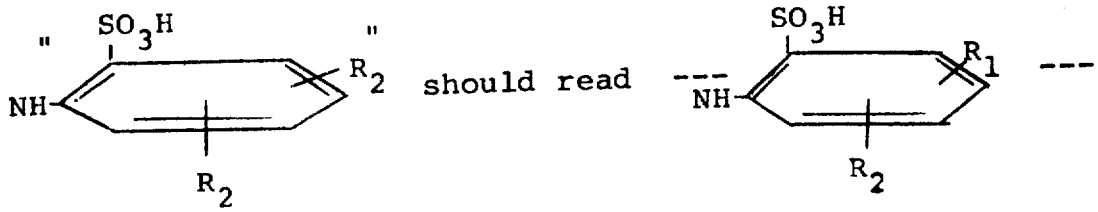

Signed and sealed this 16th day of July 1974.

(SEAL)
Attest:

McCOY M. GIBSON, JR.
Attesting Officer

C. MARSHALL DANN
Commissioner of Patents